Sept. 22, 1936. L. E. POWER Re. 20,117
METHOD OF APPLYING INSULATOR COATING
Original Filed Sept. 29, 1926
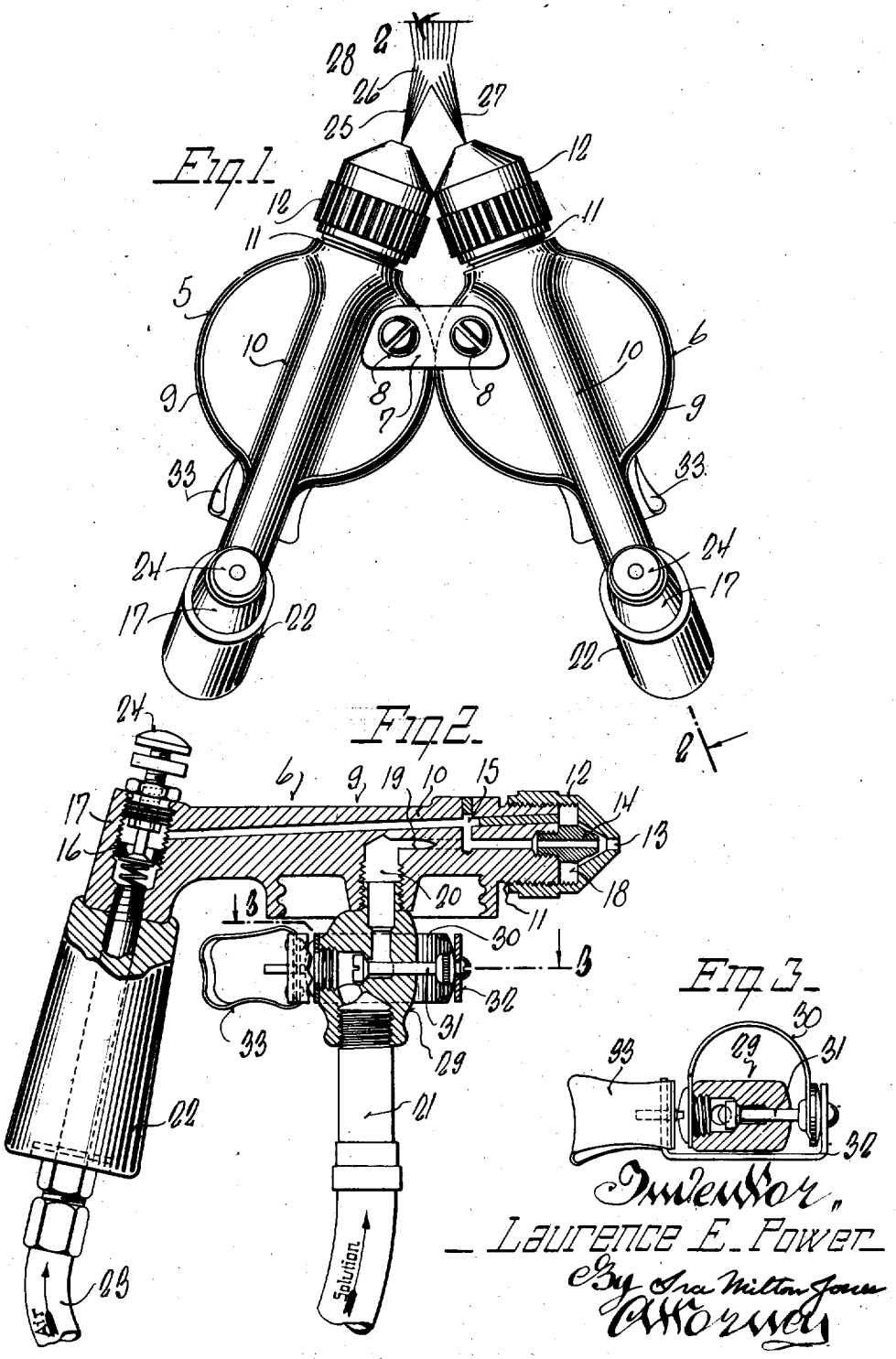
Inventor,
Laurence E. Power
By Ira Milton Jones
Attorney Reissued Sept. 22, 1936 Re. 20,117

UNITED STATES PATENT OFFICE 20,117

METHOD OF APPLYING INSULATOR COATING

Laurence E. Power, Milwaukee, Wis., assignor, by mesne assignments, to Allen-Bradley Company, Milwaukee, Wis., a corporation of Wisconsin Original application September 29, 1926, Serial No. 138,494. Divided and application August 26, 1929, Serial No. 388,542. Original No. 1,997,874, April 16, 1935. Application for reissue July 29, 1936, Serial No. 93,297

4 Claims. (Cl. 91—68)

This invention relates to certain new and useful improvements in apparatus for and method of applying insulator coating and is a division of my application filed September 29, 1926, Serial No. 138,494.

Heretofore, it has been customary to line housings and cabinets for electrical controls by gluing sheet asbestos or other insulating material thereto which has proven objectionable in that sheet asbestos is not only expensive but costly to apply and further, its resistance to an electrical arc is unsatisfactory.

Therefore, this invention contemplates as one of its objects the provision of an improved method of lining cabinets which is comparatively cheap to apply and whereby a very efficient insulating surface is supplied capable of offering an excellent resistance to destructive arcing forces.

Another object of this invention resides in the provision of an improved method of applying a lining surface to walls which consists in simultaneously spraying two solutions to merge just prior to or as they engage the surface to be lined, the solutions having the characteristics of thickening immediately upon contact with each other.

And a still further object of this invention resides in the provision of an improved device whereby two solutions may be so applied to a surface as to merge just at or prior to their engagement therewith.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a top plan view of a compound air brush or spray of the type employed in conjunction with my improved insulator lining and method of applying the same;

Figure 2 is a view, partly in section and partly in elevation, taken through one unit of the compound spray on the plane of the line 2—2 of Figure 1, and Figure 3 is a view taken transversely through Figure 2 on the plane of the line 3—3 and illustrating one of the control valves of a spray unit.

The present conventional manner of insulating the interior wall surfaces of metal cabinets employed in connection with switches and other electric apparatus, is to line the same with asbestos paper. While this manner of lining cabinets has been in vogue for many years and meets with approval by the board of underwriters, it is open to many serious objections such as the inability of asbestos paper to satisfactorily resist an electric arc and also that it is very expensive to apply, both from the standpoint of material and labor.

This invention, therefore, contemplates the elimination of the cumbersome manner of lining cabinets heretofore used, by the substitution of an improved insulating solution and apparatus for and method of applying the same wherein a better insulating lining is obtained at a considerably reduced cost.

This objectionable type of lining is replaced by one composed of a solution of glue, water and powdered mica applied to the surface and allowed to dry. It has been found from experience that the above solution in the following proportions:

| | Parts by weight |
|---|---|
| Glue | 3 |
| Water | 5 |
| Powdered mica | 4 |

withstand the arc test in a very satisfactory manner, but is open to the objection that when applied to an inclined surface it has a tendency to run, making its application tedious and difficult except on a level surface.

The glue employed in the above solution is preferably made according to the following formula:

| | Parts by weight |
|---|---|
| Animal glue (16 to 18 cent grade) | 80 |
| Water | 50 |
| Glucose | 20 |
| Glycerine | 30 |
| Sulphonated oil | 8 |

although it is to be understood that any glue capable of providing the necessary adherence may be used. The mica employed is preferably a two hundred mesh.

Sodium silicate, or water glass, may be added to the solution of glue, water and mica, when the following approximate proportions are preferably employed:

| | Parts by weight |
|---|---|
| Glue | 7 |
| Water | 12 |
| Mica | 5 |
| Sodium silicate (ordinary commercial grade) | 5 |

The glue and water are first mixed, the powdered mica then thoroughly stirred therein and the sodium silicate or water glass added. Immediately upon the addition of the sodium silicate, the viscosity of the solution increases due to the precipitation of colloids, or gel formations.

To facilitate the application of the solution to a surface the same is heated to a working temperature preferably under 160 degrees Fahrenheit, at which temperature the same may be applied by means of a brush. Experience has demonstrated that a solution applied as above has the characteristic of remaining where placed on a surface without showing a tendency to run irrespective of the inclination of the surface.

However, a solution having sodium silicate therein is difficult to apply in a smooth even coating, and this objectionable feature is overcome by spraying the solution in two streams one including glue, water and mica, and the other sodium silicate, the streams preferably coming together just prior to or as they strike the surface to be lined. When applied in this manner, any desired thickness may be applied and the solution shows no tendency to run due to the immediate increase in viscosity thereof as the sodium silicate comes into contact with the glue, water and powdered mica.

When the solution is sprayed in divided form the following approximate proportions may be employed:

| | Parts by weight |
|---|---|
| Glue | 7 |
| Water | 20 |
| Mica | 5 |
| Sodium silicate | 5 |

The proportion given above may be varied considerably and still produce excellent results, as it is difficult in actual practice, where the materials are sprayed separately, to maintain the exact proportions between the glue, water and mica, and sodium silicate. It is desirable, however, to avoid a large excess of sodium silicate over that which is necessary to produce the desired increase in viscosity as sodium silicate is not a good insulator at high temperatures.

In the accompanying drawing, to which reference is directed, is illustrated the novel spraying apparatus which may be employed to apply my solution, which is preferably divided with the sodium silicate in one container, not shown, and the glue, water and mica in another, not shown.

The spraying apparatus consists of two spray guns or brushes 5 and 6 of complementary construction connected by a plate or bridging member 7 fixed thereto by screws or other fastenings 8. As the spray guns or brushes are identical in construction, the following description refers to but one.

The spray gun consists of a casting 9 having a horizontal barrel 10 the outer end of which is exteriorly threaded, as at 11, to adjustably receive a spray nozzle or end cap 12. The spray nozzle is provided with a central spray orifice 13 of conical shape at its inner end to cooperate with a jet 14 communicating with an air passageway 15 extending throughout the length of the barrel to one side of a valve 16 mounted in the rear end 17 thereof. The nozzle or end cap 12 has the jet 14 projecting into the conical shaped portion of its orifice 13 but spaced therefrom to provide a passage communicating with a chamber 18 from which one or more passages 19 lead to a threaded bore 20 with which a supply tube 21 leading from the container, not shown, filled with the solution, is connected.

A handle or grip 22 is fixed to the end 17 of the barrel and has an air supply tube 23 extended therethrough which leads from a source of air under pressure so that operation of the valve 16 by a control knob 24 causes the air to pass through the passage 15 and out through the orifice 13 creating a suction in the chamber 18. The air passes through the orifice 13 to produce an injector effect and draws the solution from the container, not shown, through the tube 21 to be expelled through the orifice 13 in a spray.

The axes of the bores of the orifices 13 of the two spray guns intersect in the manner illustrated in Figure 1 so that the stream or spray 25 of the gun 5 commingles, as at 26, with the stream or spray 27 of the other gun 6, the point of commingling being either at the surface 28 which is being lined, or just before striking the same. Thus, assuming the stream 25 to be sodium silicate and the stream 27 glue, water and mica, the commingling thereof at the point 26 causes a change in the viscosity of the solution, and thereby prevents its running without effecting its application in an even coating.

As the fluids making up the solution have a tendency to continue flowing after the air valve 16 is closed, each line 21 has a valve 29 therein which is normally urged closed by a suitable spring 30 connected with the stem 31 of the valve member. Also connected with the valve stem is an operating member 32 to which a finger receiving loop 33 is connected to permit the operator to hold the spray gun with the index finger through the loop 33 and the thumb engaging the button 24. Thus, in operation, the operator holds a spray gun in each hand and exerts a pull on the straps 33 and depresses the buttons 24.

From the foregoing description taken in connection with the accompanying drawing, it will be readily evident to those skilled in the art to which this invention appertains that I provide an improved insulating lining and method of and apparatus for applying the same which very efficiently and satisfactorily insulates the interior surface of cabinets and the like, and has the ability to successfully withstand destructive arcing forces.

What I claim as my invention is:

1. The hereindescribed method of forming an insulating composition and lining a wall therewith, which consists in simultaneously directing a spray of glue and water solution containing mica in suspension and a spray of a solution of sodium silicate toward each other and on the wall, the solutions commingling to produce a precipitate in the form of a substantially immobile composition lining the wall.

2. The hereindescribed method of forming a wall lining composition and lining a wall therewith, which consists in simultaneously spraying a glue solution and a colloidal solution having the ability to cause a precipitation of colloids in the glue solution, onto the wall and toward each other, so that the solutions commingle at or near the wall surface.

3. The hereindescribed method of forming a wall lining composition and lining a wall therewith, which consists in simultaneously spraying onto a wall and toward each other, so that they commingle at or near the wall surface, a solution of sodium silicate and a colloidal solution from which the colloids will be precipitated by the sodium silicate solution.

4. The hereindescribed method of forming an insulating composition and lining a wall therewith, which consists in simultaneously spraying a glue solution and a colloidal solution having the ability to cause a precipitation of colloids in the glue solution, onto the wall and toward each other, so that the solutions commingle at or near the wall surface, one of said solutions containing an inert insulating material.

LAURENCE E. POWER.